Patented Jan. 9, 1934

1,943,181

UNITED STATES PATENT OFFICE 1,943,181

COMPOSITION OF MATTER

William J. Liipfert, Fort Valley, Ga.

No Drawing. Application February 15, 1930
Serial No. 428,836

1 Claim. (Cl. 167—14)

The present invention relates to a new and useful agricultural fungicide and bactericide, and the method for preparing the same. It has particular reference to a new method of combating fungi and bacteria by the use of basic zinc sulphate.

I am aware that various fungicides and bactericides containing zinc sulphate are now in use. I am also aware that one of the most efficient fungicides heretofore known is Bordeaux mixture, a basic sulphate of copper. I also know that one of the great drawbacks to the general use of basic copper sulphate is its great toxicity towards certain form of plant life and that for this reason, if for no other, the fungicides and bactericides having as their essential ingredients, zinc sulphate are superior to Bordeaux mixture. The high toxicity of the Bordeaux mixture is due, in large measure, to the copper sulphate contained therein. Due to the fact that it is superior to copper sulphate, the use of zinc sulphate in fungicide and bactericide preparations is increasing, and this is particularly true with regard to the destruction of the bacteria and other pests that infest peach trees. It is well known that peach trees are susceptible to bacteriosis and it has been found that zinc sulphate is very effective in combating the organism responsible for it.

Insofar, however, as I am aware, basic zinc sulphate has never been used in this connection. It is common practice to use the fully hydrated zinc sulphate (or white vitriol as it is called) which contains seven molecules of water of crystallization. Now, since this salt is in crystalline form, it cannot conveniently or practically be used in "dusting" operations. That is to say, it is necessary either to dissolve the $ZnSO_4.7H_2O$ in water of some other liquid medium and spray this liquid on the trees, or by driving off the water of crystallization with heat, obtain a dry powder which may be "dusted" on the trees. The manufacture of crystal zinc sulphate requires an outlay of comparatively expensive equipment, such as digesters, crystallizers, centrifuges, etc., and the finished product, limited for use as a spray only, being more costly to produce than my new product, basic zinc sulphate, which by my method is manufactured by a direct process with a minimum of equipment and expense, and is yet suitable for either "spraying" or "dusting". While dehydrated zinc sulphate may be employed for "dusting" it is not, on account of its greater density, as suitable as my product which is a very fluffy powder of superior fineness.

According to my invention, I prepare zinc sulphate in the form of a substantially dry powder which may be "dusted" on the plants or trees. The product obtained according to my new process does not require dehydration in order to make it available for use in dusting plants or trees to destroy pests, consequently it will readily be seen that a great saving in the cost of the product is thereby effected.

In carrying my invention into effect, I treat either metalic zinc or zinc oxide with sulphuric acid whereby zinc sulphate is obtained in solution. I next add an excess of lime either in the form of CaO or $Ca(OH)_2$. whereby the basic zinc sulphate is precipitated.

Other alkali, or alkaline earth oxides or hydrates may be used but I prefer those of calcium because of their availability and relative cheapness. After precipitation I either dry and grind the rather thick pasty mass of precipitated basic zinc sulphate directly, or first filter off the precipitate, then dry and grind. I wish it noted that if I choose to do the latter the finished product will contain a larger proportion of basic zinc sulphate due to the reduction in total solids caused by the solubility of a certain quantity of calcium sulphate which is removed in the filtrate. The novel method that I employ in manufacturing my new product may be illustrated by the following specific example, which though being the preferred embodiment of my invention should not be interpreted as in any way limiting the invention.

In a suitable vessel I mix for example, 10 parts by weight of 98% zinc oxide with 60 parts of water and to this mixture add slowly approximately 12 parts of 93% sulphuric acid, or its equivalent in acid of other concentrations. If the sulphuric acid is much weaker than the above I make allowance in water mixed originally with the zinc oxide in order to keep the resultant zinc sulphate solution at approximately the strength indicated, i. e. 21% $ZnSO_4$. It will be apparent that any sulphuric acid-soluble zinc bearing material that yields a relatively pure zinc sulphate solution would be suitable; I therefore do not limit myself to the use of zinc oxide, or metallic zinc. Also other strengths of zinc sulphate solution may be employed, my choice of the above being made because it gives on precipitation a suspension of basic zinc sulphate in water that is suitable for handling in connection with an atmospheric drum dryer.

The zinc sulphate solution, which may or may not be at an elevated temperature, is now run into a vessel fitted with an agitator. To the zinc sulphate solution I now add slowly while stirring, a mixture of 10 parts Ca(OH)$_2$ and 60 parts water. This lime, water mixture may or may not be at an elevated temperature.

In practice where the zinc sulphate solution has been freshly prepared its temperature may be well over 100° F. due to the reaction, and if calcium oxide is used the temperature of the calcium hydroxide water mixture will be greatly elevated due to the heat of hydration. An elevated temperature, however, is not essential to the formation of basic zinc sulphate which is precipitated as the calcium hydroxide suspension is mixed with the zinc sulphate solution. I continue the addition of the predetermined quantity of calcium hydroxide until, in the mixture, the calcium hydroxide is left in sufficient excess to assure the precipitation of all the zinc sulphate as basic zinc sulphate. The resultant suspension of basic zinc sulphate which is a rather thick pasty mass containing approximately 25% solids, I now run to an atmospheric drum dryer, or other suitable drying apparatus where the water is removed by evaporation, and the basic zinc sulphate is subsequently ground to a substantially dry powder. While I choose to add the lime suspension to the zinc sulphate solution I do not wish to be limited to this procedure for I have found that by reversing it an equally satisfactory product may be obtained. By this process I find that I obtain a yield of approximately 28 parts basic zinc sulphate. This material, I believe, conforms to the formula ZnSO$_4$.Zn(OH)$_2$ plus one molecule of CaSO$_4$ which as a byproduct of the reaction is present in the finished product as an inert impurity, plus a certain quantity of Ca(OH)$_2$ determined by the amount of lime added in excess.

A typical analysis of the product made as above shows:—

| | Percent |
|---|---|
| CaO | 25.08 |
| SO$_3$ | 31.34 |
| ZnO | 32.10 |
| H$_2$O | 11.48 |
| Total | 100.00 |

Or:—

| | Percent |
|---|---|
| ZnSO$_4$Zn(OH)$_2$ | 51.44 |
| CaSO$_4$ | 26.44 |
| Ca(OH)$_2$ | 18.74 |
| H$_2$O (combined with CaSO$_4$, etc.) | 3.38 |
| Total | 100.00 |

It will be observed that I use a large excess of lime over the theoretical quantity required by the equation;

$$2ZnSO_4 + Ca(OH)_2 = ZnSO_4Zn(OH)_2 + CaSO_4.$$

But it is to be understood that if desired the proportions more closely approaching the theoretical quantities may be employed. I prefer to use a large excess of lime, not only to compensate for impurities that may be found in the ordinary raw materials of commerce, and to assure complete precipitation of the zinc as basic zinc sulphate, but in order to provide a uniformly mixed product containing an excess of lime, thus making it a safer preparation when used in connection with arsenate of lead as an insecticidal spray or dust.

What I claim is:

A bactericide and fungicide composition comprising basic zinc sulphate intermixed with free calcium hydroxide in the form of a powder adapted to be dusted on plants and trees.

WILLIAM J. LIIPFERT.